(12) United States Patent
Weng et al.

(10) Patent No.: US 7,501,460 B1
(45) Date of Patent: Mar. 10, 2009

(54) SPLIT-STREAM PROCESS FOR MAKING NANOCOMPOSITES

(75) Inventors: Weiqing Weng, Houston, TX (US);
Caiguo Gong, Pearland, TX (US);
Anthony Jay Dias, Houston, TX (US);
Robert Norman Webb, Kingwood, TX (US); James Peter Stokes, Houston, TX (US)

(73) Assignee: ExxonMobile Chemical Patents Inc., Houston, TX (US)

( * ) Notice: Subject to any disclaimer, the term of this patent is extended or adjusted under 35 U.S.C. 154(b) by 848 days.

(21) Appl. No.: 11/183,361

(22) Filed: Jul. 18, 2005

(51) Int. Cl.
*C08J 3/20* (2006.01)

(52) U.S. Cl. .................. 523/351; 524/445; 524/446; 524/447

(58) Field of Classification Search .............. 523/351; 524/445, 446, 447
See application file for complete search history.

(56) References Cited

U.S. PATENT DOCUMENTS

| | | | | |
|---|---|---|---|---|
| 5,576,372 | A | 11/1996 | Kresge et al. | 524/442 |
| 5,576,373 | A | 11/1996 | Kresge et al. | 524/445 |
| 5,665,183 | A | 9/1997 | Kresge et al. | 152/204 |
| 5,807,629 | A | 9/1998 | Elspass et al. | 428/323 |
| 5,883,173 | A | 3/1999 | Elspass et al. | 524/446 |
| 5,936,023 | A | 8/1999 | Kato et al. | 524/445 |
| 5,973,053 | A | 10/1999 | Usuki et al. | 524/445 |
| 6,034,164 | A | 3/2000 | Elspass et al. | 524/445 |
| 6,060,549 | A | 5/2000 | Li et al. | 524/445 |
| 6,103,817 | A | 8/2000 | Usuki et al. | 524/574 |
| 6,121,361 | A | 9/2000 | Usuki et al. | 524/445 |
| 2005/0027057 | A1 | 2/2005 | Dias et al. | 524/445 |
| 2005/0027058 | A1 | 2/2005 | Dias et al. | 524/445 |

FOREIGN PATENT DOCUMENTS

| | | |
|---|---|---|
| JP | 2000-160024 | 6/2000 |
| WO | WO 94/22680 | 10/1994 |
| WO | WO 98/03562 | 1/1998 |
| WO | WO 01/85831 | 11/2001 |
| WO | WO 02/100935 | 12/2002 |
| WO | WO 02/100936 | 12/2002 |
| WO | WO 2004/058874 | 7/2004 |

OTHER PUBLICATIONS

Abstract for JP 2000-160024 Yuichi et al. entitled "Gas-Barrier Thermoplastic Resin-Elastomer and Laminates Using Them", Jun. 13, 2000.
U.S. Appl. No. 11/184,000, filed Jul. 18, 2005, Weng et al., "Functionalized Isobutylene Polymer-Inorganic Clay Nanocomposites and Organic-Aqueous Emulsion Process".

*Primary Examiner*—Edward J Cain
(74) *Attorney, Agent, or Firm*—Xiaobing Feng; Catherine L. Bell

(57) ABSTRACT

The present invention is a process to produce a nanocomposite of a elastomer and organic clay, e.g. an exfoliated clay, suitable for use as an air barrier. The process can include the steps of: (a) contacting a solution (10) of butyl rubber in an organic solvent with a halogen (12) to form a halogenated butyl rubber solution (16); (b) neutralizing the halogenated butyl rubber solution; (c) functionalizing at least a portion (18) of the halogenated butyl rubber; (d) mixing a dispersion (22) of clay with the functionalized butyl rubber (18) to form a masterbatch (26) comprising a polymer-clay nanocomposite; (e) combining the masterbatch (26) with the rest of the halogenated butyl rubber solution (20) to form a second mixture (28); (e) recovering the nanocomposite from the second mixture (28). The nanocomposite so formed has improved air barrier properties and is suitable for use as a tire innerliner or innertube.

58 Claims, 4 Drawing Sheets

SPLIT-STREAM PROCESS FOR MAKING NANOCOMPOSITES

FIELD OF THE INVENTION

This invention relates to low-permeability nanocomposites useful for air barriers, processes to produce the same, and their use in articles of manufacture.

BACKGROUND OF THE INVENTION

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability; especially a dynamically vulcanized elastomer nanocomposite such as used in the manufacture of tires.

The preparation of nanocomposites uses a number of methods to generate exfoliated clays. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874.

One method to improve the organoclay performance is to use functionalized polymers to treat the clay. This approach uses materials that are soluble in water or to materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to achieve some success in the formation of nanocomposites.

For example, it is known to utilize exfoliated-clay filled nylon as a high impact plastic matrix, such as disclosed in U.S. Pat. No. 6,060,549 to Li et al. In particular, Li et al. disclose a blend of a thermoplastic resin such as nylon and a copolymer of a $C_4$ to $C_7$ isoolefin and a para-methylstyrene and a para-(halomethylstyrene), the blend also including nylon containing exfoliated-clays that are used as a high impact material. Further, Japanese Unexamined Application P2000-160024 to Yuichi et al. discloses a thermoplastic elastomer composition which can be used as an air barrier. The nanocomposite in Yuichi et al. includes is a blend similar to that disclosed in Li et al.

Elastomeric nanocomposite innerliners and innertubes have also been formed using a complexing agent and a rubber, where the agent is a reactive rubber having positively charged groups and a layered silicate uniformly dispersed therein. See, for example, Kresge et al. U.S. Pat. Nos. 5,665,183 and 5,576,373. This approach uses pre-formed positively charged reactive rubber components.

Nanocomposites have also been formed using non-ionic, brominated copolymers of isobutylene and para-methylstyrene, and blends of these copolymers with other polymers. See, for example, Elspass et al., U.S. Pat. No. 5,807,629, and U.S. Pat. No. 6,034,164.

As described above, these nanocomposites are made by mixing of elastomers and organoclays either at melt state or in solution; and, due to the hydrophobic nature of the polymer, the organoclays are typically modified to provide better interaction between the clays and the polymers. The modification process typically involves exchange of Na+ cations in the inorganic clay with organic modifiers such as tetra alkyl ammonium salts. The process is expensive and most modified clays are not exfoliated in polymers or in organic solvent.

In commonly assigned co-pending application U.S. Ser. No. 11/184,1000, "Functionalized Isobutylene Polymer-Inorganic Clay Nanocomposites and Organic-Aqueous Emulsion Process," Weiqing Weng et al., filed of even date herewith, an organic-aqueous emulsion process is disclosed in which clay dispersed in an aqueous phase is mixed with a functionalized elastomer cement, and a nanocomposite is recovered from the emulsion. Because the process does not rely on dispersing the clay in an organic phase, the clay can be an unmodified inorganic clay that is dispersed in water, optionally with an emulsifier and/or the elastomer can be functionalized with emulsifying moieties.

Another reference of interest includes WO 98/03562.

Regardless of the method of preparing the nanocomposites, the art generally makes the nanocomposite as a separate step apart from other polymer processing. Moreover, the art generally processes the bulk of the polymer to be made into the nanocomposite since masterbatching frequently leads to undesirable gel formation. There is a need for a less costly, more efficient method to produce polymer/clay nanocomposites.

SUMMARY OF THE INVENTION

The present invention provides a less costly, more efficient method to manufacture polymer-clay nanocomposites. The method can be integrated with an elastomer halogenation process by treating a relatively small slipstream of polymer solution from the halogenation process with a clay dispersion to form a concentrated polymer-clay stream, and returning the concentrated polymer-clay stream to the halogenation process to be mixed with a main polymer stream. The return polymer-clay stream is sufficiently concentrated to provide the desired total clay content in the elastomer product after blending with the remaining polymer stream, but not so concentrated as to adversely affect polymer properties, e.g. gel formation. The slipstream can be taken at any suitable point in the halogenation process upstream from halogenated elastomer recovery, for example, following a caustic washing step but before the final solvent removal step. Similarly, the polymer-clay concentrate stream can be returned for blending with the remaining polymer stream at any suitable point in the halogenation process, for example, downstream from the slipstream takeoff but upstream from final solvent removal.

In one embodiment the invention provides a process to produce a nanocomposite including the steps of: (a) contacting a solution of elastomer in an organic solvent with a halogen to form a halogenated elastomer cement; (b) treating a first portion of the halogenated elastomer cement with a clay dispersion to form a masterbatch comprising a concentrated polymer-clay nanocomposite dispersion; (c) blending the masterbatch with a second portion of the halogenated elastomer cement to form a mixture comprising a dispersed halogenated elastomer-clay nanocomposite; and (d) recovering the halogenated elastomer-clay nanocomposite from the mixture.

In one embodiment, the process can also include the step of neutralizing the halogenated elastomer cement from step (a) prior to the treatment in step (b). In another embodiment, neutralizing the mixture from step (c) can occur prior to the recovery in step (d).

In one embodiment, the elastomer can be a butyl rubber. The concentration of the butyl rubber in the cement can range from 1 to 30 percent by weight. In another embodiment, the butyl rubber can range from 10 to 25 percent by weight of the cement. The concentration of the clay in the dispersion can range from 0.1 to 5 percent by weight of the dispersion. In another embodiment, the amount of clay in the dispersion can range from 0.3 to 3 percent by weight of dispersion. The pH of the dispersion can be between 4 and 13, for example. The volume ratio of clay dispersion to halogenated elastomer cement in step (b) can range from 0.01:1 to 1:1 in one embodiment, and from 0.1:1 to 0.9:1, or from 0.3:1 to 0.7:1 in other embodiments.

The weight ratio of the first portion of halogenated elastomer cement to the second portion of halogenated elastomer cement can be from 1:99 to 30:70 on a liquid-free basis, preferably 3:97 to 20:80, more preferably 5:95 to 10:90.

The clay dispersion can include inorganic clay, can be essentially free of organically modified clay (organoclay), or can include organoclay. The clay can be dispersed in any liquid medium as desired, such as, for example, water, organic liquid which can be miscible or immiscible with water, and/or in a mixture of water and organic liquid which can be in the form of a solution or an emulsion. The clay dispersion can include various modifiers, surfactants, emulsifiers, stablizers, exfoliants, or the like. In one embodiment, the clay dispersion can be an aqueous slurry of inorganic clay.

The halogenated elastomer can be a halogenated isobutylene polymer. The halogen can be bromine, chlorine, or mixtures thereof.

The recovery step can include filtering the nanocomposite from the mixture or from at least one phase of the mixture where the mixture is an emulsion. In another embodiment, the recovery can include precipitating the elastomer-clay nanocomposite with an antisolvent, for example, from the mixture, which can optionally be concentrated by liquid removal before the precipitation step. In another embodiment, the recovery can include evaporating liquid from at least one phase of the mixture. In one embodiment, the clay dispersion is inorganic clay in an aqueous slurry, and the recovery can include evaporating solvent from the mixture from (c) to form an aqueous nanocomposite suspension, and processing the suspension through one or more extruders to dry the nanocomposite.

In one embodiment, the first portion of the halogenated polymer solution can be functionalized to form a polymer chain E comprising an ammonium-functionalized group. In a particular embodiment, the ammonium functionalized group can be described by the following group pendant to the polymer chain E:

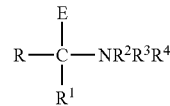

wherein R and $R^1$ are the same or different and are one of hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In certain embodiments, the ammonium functionalized group is selected from the group comprising N-methyldiethanolamine, N,N-dimethylethanolamine, triethanolamine, or combinations thereof.

The mixing of the clay and the first portion of rubber can include an emulsifier. In one embodiment, the emulsifier can be selected from the group consisting of tertiary amines, diamines, polyamines, amine salts, quaternary ammonium compounds, alkyl glucosides, ethoxylates, and the like. In other embodiments, the emulsifier can be alkyl ethoxylate, linear alcohol ethoxylate, amide ethoxylate, amine ethoxylate, phenol or alkyl phenol ethoxylate, or the like. In yet other embodiments, the emulsifier can be coco amine ethoxylate, tallow amine ethoxylate, oleyl amine ethoxylate, nonyl phenol ethoxylate, and so on.

The clay can be a silicate. In one embodiment, the silicate can be smectite clay. In other embodiments, the smectite clay can be montmorillonite, nontronite, beidellite, bentonite, volkonskoite, laponite, hectorite, saponite, sauconite, magadite, kenyaite, stevensite, vermiculite, halloysite, hydrotalcite, etc., or a combination thereof. In particular embodiments, the smectite clay can be montmorillonite, bentonite, vermiculite, or a combination thereof.

The clay can be organically modified clay or can be modified during the process with an exfoliating additive. The exfoliating additive can be selected from the group consisting of ammonium ion, alkylamines, alkylammonium ion, and phosphonium or sulfonium derivatives of aliphatic, aromatic or arylaliphatic amines, phosphines, and sulfides. In some embodiments, the amine compound has the structure $R^{12}R^{13}R^{14}N$, wherein $R^{12}$, $R^{13}$, and $R^{14}$ are the same or different $C_1$ to $C_{30}$ alkyls or alkenes. In other embodiments, the amine compound has the structure $R^{12}R^{13}R^{14}N$, wherein $R^{12}$, $R^{13}$, and $R^{14}$ are the same or different $C_1$ to $C_{20}$ alkyls or alkenes. In yet other embodiments, the amine compound is a long chain tertiary amine, wherein at least $R^{12}$ is a $C_{14}$ to $C_{20}$ alkyl or alkene.

In other embodiments, the amine compound can be a diamine, such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. The diamine can have the structure $R^{18}R^{19}N$—$R^{20}$—$NR^{21}R^{22}$, wherein $R^{18}$, $R^{19}$, $R^{20}$, $R^{21}$, and $R^{22}$ are the same or different $C_1$ to $C_{30}$ alkyls or alkenes in one embodiment, are the same or different $C_1$ to $C_{20}$ alkyls or alkenes in another embodiment. In one embodiment, at least one of the N-alkyl or N-alkene groups (i.e. $R^{18}$, $R^{19}$, $R^{21}$, and or $R^{22}$) has from 8 to 30 carbon atoms, or from 14 to 20 carbon atoms in another embodiment. Specific representative examples can include N-coco-1,3-diaminopropane, N-oleyl-1,3-diaminopropane, N-tallow-1,3-diaminopropane, N,N,N'-trimethyl-N'-tallow-1,3-diaminopropane, and the like, for example.

In other embodiments, the exfoliating additive can be a polysilane of the structure —Si(R$^{15}$)$_2$R$^{16}$ where R$^{15}$ is the same or different at each occurrence and is selected from alkyl, alkoxy or oxysilane and R$^{16}$ is an organic radical compatible with the matrix polymer of the composite, preferably an alkyl, alkoxy or oxysilane. In other embodiments, the exfoliating additive can include protonated amino acids and salts thereof containing 2-30 carbon atoms such as 12-aminododecanoic acid, epsilon-caprolactam and like materials.

The isobutylene polymer can be an interpolymer of a C4-C7 isoolefin and an alkylstyrene. The alkylstyrene can be para-methylstyrene. The isobutylene polymer can include functional groups selected from the group consisting of halides, ethers, amines, amides, esters, acids, and hydroxyls.

The solvent used in the polymer solution can include alkanes, alkenes, aromatics, nitrated alkanes, halogenated alkanes, and mixtures thereof. In one embodiment, the solvent can be hexane, cyclohexane, toluene, etc. Preferably the solvent comprises one or more C2 to C40 linear branched or cyclic alkanes. Preferably the solvent comprises one or more of hexane, cyclohexane, toluene, tetrahydrofuran, butane, isobutene, pentane, octane isooctane, nonane dodecane or mixtures thereof.

In one embodiment, the invention provides a process to produce a nanocomposite comprising the steps of: contacting a solution of butyl rubber in an organic solvent with a halogen to form a halogenated butyl rubber solution; neutralizing the halogenated rubber solution with a base to from a neutralized halogenated butyl rubber solution; contacting a first portion of the neutralized halogenated butyl rubber solution with a functionalizing agent to from a functionalized butyl rubber solution; mixing an aqueous slurry of inorganic clay with the functionalized butyl rubber solution to form an emulsion masterbatch comprising a concentrated polymer-clay nanocomposite; blending the masterbatch with a second portion of the halogenated butyl rubber solution to form a mixture comprising a polymer-clay nanocomposite dispersed in the halogenated butyl rubber; and recovering the halogenated butyl rubber-clay nanocomposite from the second emulsion.

DETAILED DESCRIPTION

Figure 1:
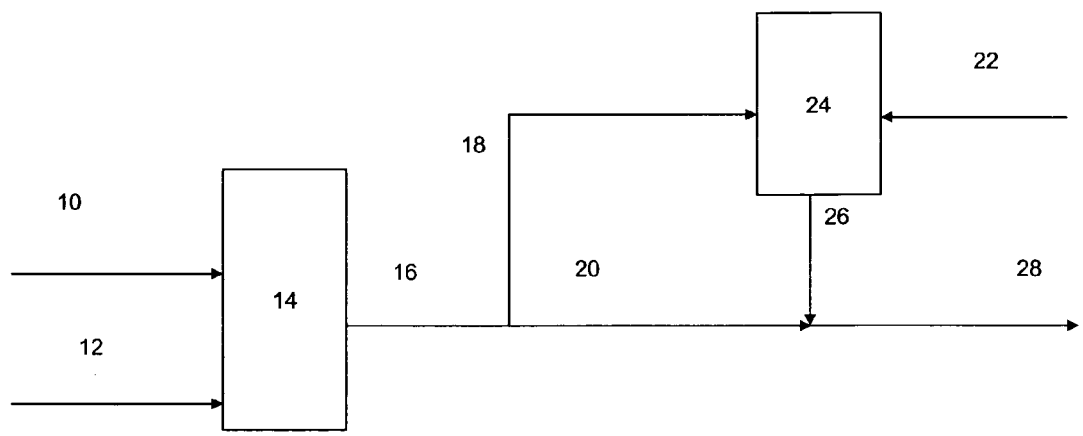
FIG. 1 illustrates a simplified flow diagram of a process integrating butyl rubber halogenation and nanocomposite formation according to an embodiment of the present invention.

This invention describes a process for making polymer/clay nanocomposites. The process can produce a nanocomposite of a halogenated elastomer and a clay, desirably an exfoliated clay, suitable for use as an air barrier. The nanocomposite formed by the process of this invention has improved air barrier properties and is suitable for use as an innerliner or innertube.

DEFINITIONS

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst components are described as comprising neutral stable forms of the components, it is well understood by one of ordinary skill in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mole percent repeat units from isobutylene.

As used herein, isoolefin refers to any olefin monomer having at least one carbon having two substitutions on that carbon.

As used herein, "multiolefin" refers to any monomer having two or more unsaturations (typically double bonds), for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between the layers of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each particle. In an embodiment, sufficient polymer is present between the platelets such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing herteroatoms as discussed in more detail below.

Halogenated Elastomer

The nanocomposite of the present invention includes at least one halogenated elastomer comprising $C_4$ to $C_7$ isoolefin derived units. The isoolefin may be a $C_4$ to $C_8$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the halogenated elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, and piperylene.

In one embodiment, the halogenated elastomer includes an isoolefin derived unit, a multiolefin derived unit, and a styrenic derived unit. In another embodiment, the halogenated elastomer includes an isoolefin derived unit and a styrenic derived unit, and in yet another embodiment the halogenated elastomer includes an isoolefin derived unit and a multiolefin derived unit.

The halogenated elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

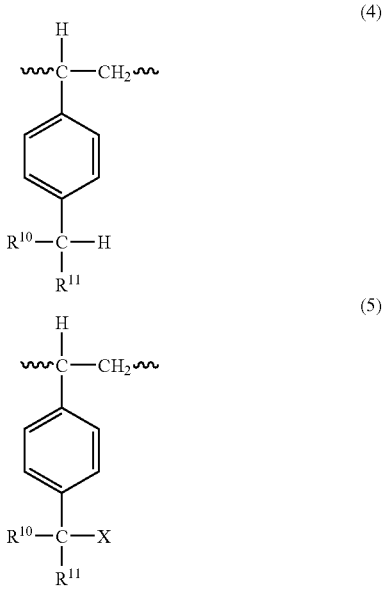

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be the functionalized structure (5) above in one embodiment, and in another embodiment from 0.1 to 5 mole percent. In yet another embodiment, the amount of functionalized structure (5) is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene and other functional groups such as ester and ether. These halogenated elastomers are commercially available as EXXPRO™ Elastomers (ExxonMobil Chemical Company, Houston Tex.), and abbreviated as "BIMS".

In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 10% of the average para-alkylstyrene content of the polymer, as measured by the procedure described in U.S. Pat. No. 5,162,445. Desirable interpolymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The BIMS polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred BIMS polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

The halogenated elastomer useful in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. No. 4,074,035 and U.S. Pat. No. 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_7$ isoolefin monomer component such as isobutylene with (2) a multiolefin, or conjugated diene, monomer component. The isoolefin is in a range from 70 to 99.5 weight percent by weight of the total comonomer mixture in one embodiment, and 85 to 99.5 weight percent in another embodiment. The conjugated diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is conjugated diene.

The isoolefin is a $C_4$ to $C_6$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 weight percent of isobutylene with 0.5 to 8 weight percent isoprene, or reacting 95 to 99.5 weight percent isobutylene with from 0.5 to 5.0 weight percent isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen content is from 0.1 to 10 weight percent based in on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated butyl or star-branched butyl rubber may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. No. 4,632,963; U.S. Pat. No. 4,649,178; U.S. Pat. No. 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described as follows (6), wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment:

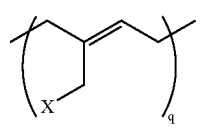

(6)

A commercial embodiment of the halogenated butyl rubber of the present invention is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 1,8 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

In another embodiment of the brominated rubber component of the invention, a branched or "star-branched" halogenated butyl rubber is used. In one embodiment, the star-branched halogenated butyl rubber ("SBHR") is a composition of a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The invention is not limited by the method of forming the SBHR. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the SBHR. The branching agent or polydiene can be any suitable branching agent, and the invention is not limited to the type of polydiene used to make the SBHR.

In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer weight percent, greater than 0.3 weight percent in one embodiment, and from 0.3 to 3 weight percent in another embodiment, and from 0.4 to 2.7 weight percent in yet another embodiment.

A commercial embodiment of the SBHR useful in the present invention is Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 weight percent relative to the SBHR. Further, cure characteristics of Bromobutyl 6222 are as follows: MH is from 24 to 38 dN·m, ML is from 6 to 16 dN·m (ASTM D2084, modified).

The halogenated rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

Amine Functionalized Halogenated Elastomers

The halogen in the above described halogenated polymer can react or form polar bonds with functional groups present in the matrix polymer, for example, acid, amino or hydroxyl functional groups, when the components are mixed at high temperatures. One embodiment of the present invention is a nanocomposite comprising a clay and a halogenated elastomer comprising $C_4$ to $C_7$ isoolefin derived units; wherein a portion of the halogen in the elastomer is electrophilically substituted with an amine-functionalized group such that the halogenated elastomer also comprises an amine-functionalized monomer unit described by the following group pendant to the elastomer E:

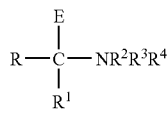

wherein R and $R^1$ are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In a desirable embodiment, at least one of $R^2$, $R^3$ and $R^4$ are selected from $C_1$ to $C_{20}$ alkenes, $C_1$ to $C_{20}$ aliphatic alcohols, $C_1$ to $C_{20}$ aliphatic ethers, $C_1$ to $C_{20}$ carboxylic acids, nitriles, ethoxylated amines, acrylates, esters and ammonium ions.

In one embodiment, the halogenated elastomer E comprises $C_4$ to $C_7$ isoolefin derived units, para-methylstyrene derived units and para-(halomethylstyrene) derived units.

In another embodiment, the halogenated elastomer E comprises $C_4$ to $C_7$ isoolefin derived units, multiolefin derived units, and halogenated multiolefin derived units.

The functional group pendant to the elastomer E can be further described as functionalized amine, wherein at least one of $R^2$, $R^3$ and $R^4$ is selected from $C_1$ to $C_{20}$ aliphatic alcohols or ethers, $C_1$ to $C_{20}$ carboxylic acids, nitriles, esters, ammonium ions, or acrylate groups; wherein the acrylate is described by the following formula:

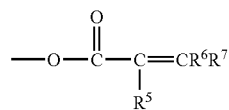

wherein $R^5$, $R^6$ and $R^7$ are the same or different and are selected from hydrogen and $C_1$ to $C_7$ alkyl or alkenyl.

In another embodiment, the amine-functionalized group is selected from ethoxylated amines having the following structure:

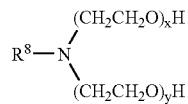

wherein $R^8$ is a $C_1$ to $C_{20}$ alkyl; and wherein x+y is a number from 2 to 50, preferably x+y is 2, 5, 10, 15, or 50.

In another embodiment, the amine-functionalized group is selected from dimethylaminoethylacrylate, dimethylaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

The amine-functionalized derived unit may be present on the halogenated elastomer from 0.01 weight percent to 10 weight percent of the elastomer in one embodiment, and from 0.1 weight percent to 8 weight percent in another embodiment, and from 0.2 to 6 weight percent in yet another embodiment, wherein a desirable range may be any combination of any upper weight percent limit with any lower weight percent limit.

The polymer component of the nanocomposites of the present invention may comprise at least one elastomer as described in any of the above elastomers or may comprise any combination of at least two or more of the elastomers described above. In an embodiment, the elastomer comprises at least one isobutylene-based polymer. In another embodiment, the elastomer comprises at least one isobutylene-based polymer and at least one other rubber. In yet another embodiment, the elastomer comprises at least two or more isobutylene-based polymers.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "high cis-polybutadiene", it is meant that 1,4-cis polybutadiene is used, wherein the amount of cis component is at least 95%. An example of a high cis-polybutadiene commercial product useful herein is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). Suitable ethylene-propylene rubbers are commercially available the VISTALON™ tradename from (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. No. 5,162,445; U.S. Pat. No. 4,074,035; and U.S. Pat. No. 4,395,506; halogenated isoprene and halogenated isobutylene copolymers, polychloroprene, and the like, and mixtures of any of the above. Some embodiments of the halogenated rubber component are also described in U.S. Pat. No. 4,703,091 and U.S. Pat. No. 4,632,963.

In one embodiment of the invention, a so called semi-crystalline copolymer ("SCC") is present as the secondary "rubber" component. Useful emi-crystalline copolymers are described in WO0/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other o-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Curatives and Other Additives

The composition of the invention may also include one or more filler components such as calcium carbonate, clay, mica, silica and silicates, talc, titanium dioxide, and carbon black. As used herein, fillers do not include inorganic clay and/or organoclay particles forming part of the nanocomposite matrix, e.g. clay particles having a dimension in the nanometer range, but larger clay particles can be used as a filler in the nanocomposites, if desired. In one embodiment, the filler is carbon black or modified carbon black. A preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2, 4, 6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

Clays

The nanocomposites of the present invention can include swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 5-20 Å, preferably 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 weight percent; between 0.1 and 3.0 weight percent in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine coumpound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N-R^{20}-NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups (i.e. $R^{18}$, $R^{19}$, $R^{21}$, and or $R^{22}$) has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure $-Si(R^{15})_2R^{16}$ where $R^{15}$ is the same or different at each occurrence and is selected from alkyl, alkoxy or oxysilane and $R^{16}$ is an organic radical compatible with the matrix polymer of the composite, preferably an alkyl, alkoxy or oxysilane.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula $Z-R^{17}-Z'$, wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, and from 5 to 20 phr in another embodiment.

Integrated Halogenation of Butyl Rubbers and Nanocomposite Processing

FIGS. 1-6 illustrate integrated processes for the production of halogenated elastomer/clay nanocomposites, where like numerals represent like parts. The integrated production of nanocomposites minimizes production costs by advantageously utilizing the existing separation/finishing equipment as well as the existing elastomer dissolution equipment. This can avoid separate and/or additional processing steps such as preparation of rubber solutions or dispersions, solvent/water removal, melt-mixing, rubber recovery, etc. that might otherwise be involved where the clay is introduced into the nanocomposite composition in a stand-alone process. The processes as described herein can also improve intercalation and exfoliation of clay in a halogenated or a functionalized halogenated elastomer. The processes can additionally limit the formation of gel and unprocessable elastomer.

Referring to FIG. 1, in one embodiment, a solution 10 of elastomer in hexane or other solvent is contacted with halogen 12 under vigorous mixing in a halogenation reactor 14, producing reactor effluent stream 16 comprising a halogenated rubber. The halogenation of butyl rubbers is described in detail in U.S. Pat. Nos. 4,074,035, 5,071,913, 5,286,804, 5,182,333 and 6,228,978, and in RUBBER TECHNOLOGY, 298-300 (Maurice Morton ed., Chapman & Hall 1995). Halogen 12 can be bromine or chlorine, for example.

Reactor effluent stream 16 can be divided into two portions 18, 20. Halogenated elastomer portion 18 can be mixed with clay or clay dispersion 22 in vessel 24 to form a masterbatch 26 containing a concentrated elastomer/clay mixture. The masterbatch 26 can be combined with second elastomer portion 20 to form stream 28 comprising a diluted elastomer/clay nanocomposite. The dilute elastomer/clay nanocomposite can then be recovered using typical halogenated elastomer finishing equipment (not shown) in a manner well known in the art. As one example, separation of the nanocomposite mixture from any solvents and/or water can include vaporization, recovery, and recycle of any organic solvent; the resulting nanocomposite—water slurry can then be finished in a series of extruders, and the dried nanocomposite baled.

In particular embodiments, the clay 22 can be organic clay or inorganic clay; the clay 22 can be modified prior to or during the formation of the masterbatch 26; the clay dispersion 22 can be slurried in water or in an organic solvent, which can be either miscible or immiscible in water; clay slurry 22 can have a pH from 4 to 13; halogenated elastomer portion 18 can be functionalized prior to or during the formation of the masterbatch 26; halogenated elastomer solution 16 can be neutralized prior to dividing halogenated elastomer solution 16 into first and second portions; halogenated portion 20 can be neutralized with excess neutralizing agent to account for solution 18; neutralization of the halogenated elastomer streams can occur after combining the nanocomposite masterbatch 26 with the second portion 20. Each of these embodiments is described in detail with respect to FIGS. 2-6.

Figure 2:
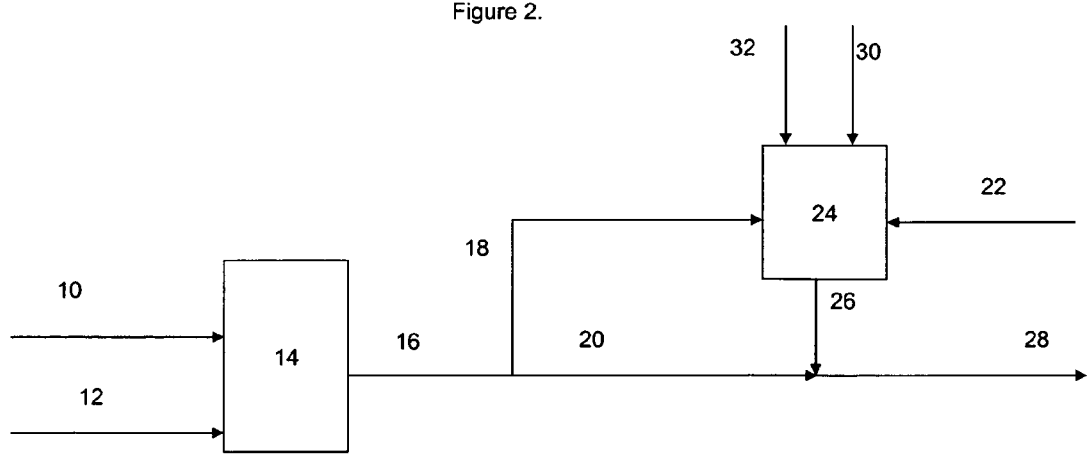
FIG. 2 illustrates a simplified flow diagram of a process integrating butyl rubber halogenation and nanocomposite formation according to an embodiment of the present invention where the process includes modification of the clay or functionalization of a portion of the halogenated polymer.
Figure 3:
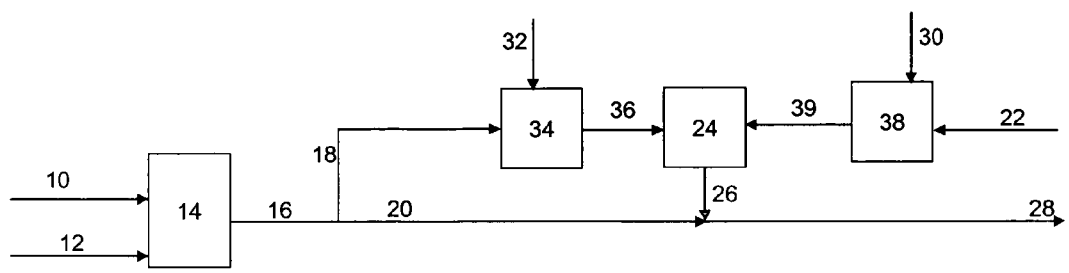
FIG. 3 illustrates a simplified flow diagram of a process integrating butyl rubber halogenation and nanocomposite formation according to an embodiment of the present invention, where the modification of the clay and/or functionalization of the polymer are performed in distinct stages.

Referring to FIG. 2, in one embodiment, clay 22 can be inorganic clay. A modifying agent can be added to vessel 24 via stream 30 to modify the inorganic clay and to form a halogenated elastomer/organic modified clay nanocomposite recovered via stream 26. In another embodiment, a functionalizing agent can be added to vessel 24 via stream 32 to functionalize the halogenated elastomer and to form a functionalized halogenated elastomer/inorganic clay nanocomposite. In other embodiments, functionalizing agent 32 and modifying agent 30 can both be added to vessel 24 to form a functionalized halogenated elastomer/organic modified clay nanocomposite recovered via stream 26.

In other embodiments, the functionalization of the elastomer and/or the modification of the clay can occur in separate vessels or reactors. For example, referring to FIG. 3, optionally, the functionalizing agent 32 can be added to the halogenated elastomer in vessel 34, resulting in functionalized halogenated stream 36, and/or the modifying agent 30 can be added to the clay 22 in vessel 38, forming modified clay stream 39. The functionalized halogenated stream 36 and modified clay stream 39 can be combined in vessel 24 to form a functionalized halogenated elastomer/clay nanocomposite.

Figure 4:
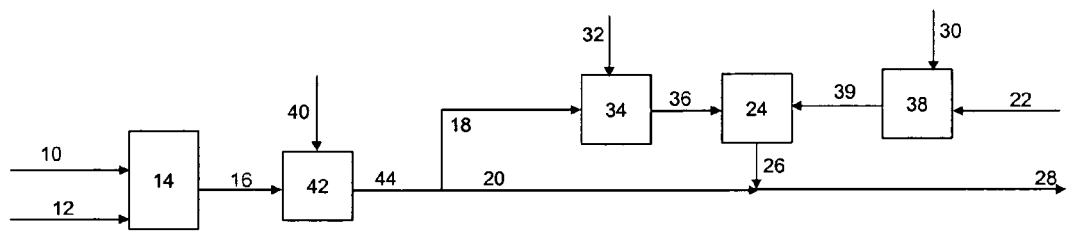
FIG. 4 illustrates a simplified flow diagram of a process integrating butyl rubber halogenation and nanocomposite formation according to an embodiment of the present invention where the halogenated solution is neutralized prior to subsequent processing.
Figure 5:
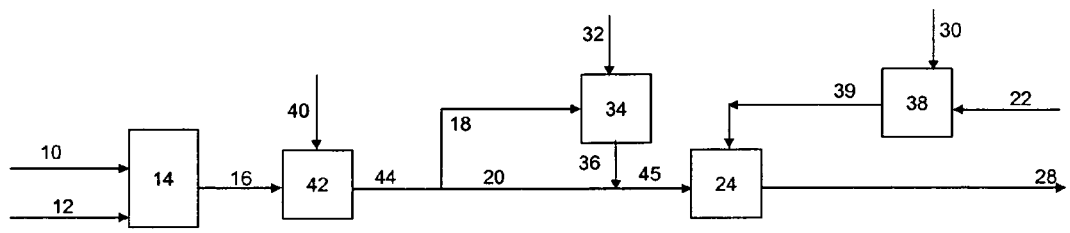
FIG. 5 illustrates a simplified flow diagram of a process integrating butyl rubber halogenation and nanocomposite formation according to another embodiment of the present invention where the halogenated solution is neutralized prior to subsequent processing.
Figure 6:
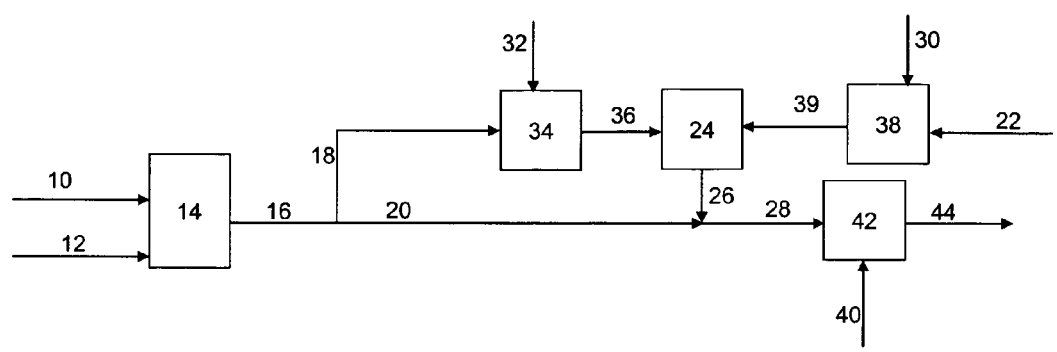
FIG. 6 illustrates a simplified flow diagram of a process integrating butyl rubber halogenation and nanocomposite formation according to an embodiment of the present invention where the nanocomposite is formed under acidic conditions and the resulting nanocomposite mixture is neutralized prior to recovery of the nanocomposite.

The halogenation process can result in the formation of acidic species in halogenated elastomer stream 16. Referring to FIGS. 4-6, the acidic species can be neutralized at various stages during the processing of the elastomer/clay nanocomposite.

In one embodiment, as illustrated in FIG. 4, neutralization can occur prior to forming the nanocomposite. For example, halogenated elastomer stream 16 can be mixed with neutralizing agent 40 in vessel 42 forming neutralized stream 44. Neutralized stream 44 can be divided into first and second portions 18, 20. In embodiments where a basic solution is desired during the mixing of the first elastomer portion 18 and clay 22, excess neutralizing agent 40 can be fed to vessel 42; alternatively, neutralizing agent can be added to clay slurry 22. In one embodiment, neutralizing agent 40 can be sodium hydroxide. In another embodiment, calcium stearate can be added to the polymer solution during neutralization.

In another embodiment, as illustrated in FIG. 5, neutralization can occur prior to forming the nanocomposite. For example, halogenated elastomer stream 16 can be mixed with neutralizing agent 40 in vessel 42 forming neutralized stream 44. Neutralized stream 44 can be divided into first and second portions 18, 20. First portion 18 can be reacted with functionalizing agent 32 in vessel 34. The resulting functionalized halogenated butyl rubber stream 36 can be recombined with second portion 20 to form mixed butyl rubber stream 45. Butyl rubber stream 45 can be mixed with clay 22 or modified clay stream 39 (if clay 22 is modified by addition of modifying agent 30) in vessel 24, producing nanocomposite stream 28.

In the embodiment of FIG. 6, neutralization can occur after forming the nanocomposite. For example, nanocomposite stream 28 can be mixed with neutralizing agent 40 in vessel 42 forming neutralized nanocomposite stream 44, which can then be recovered using typical halogenated elastomer finishing equipment (not shown).

Figure 7:
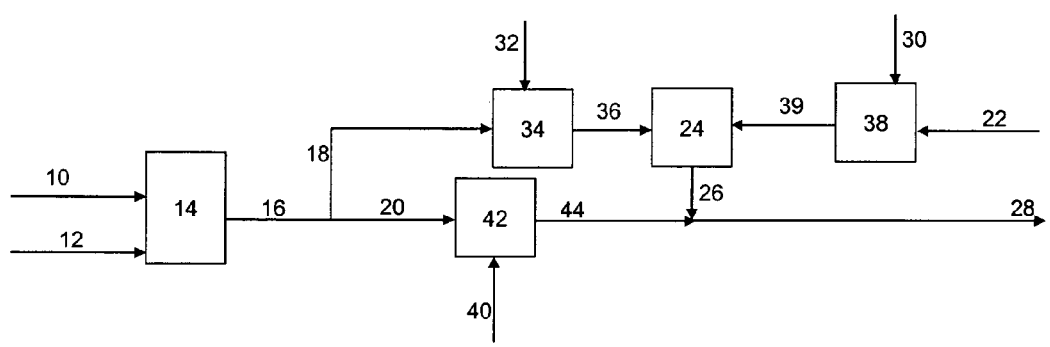
FIG. 7 illustrates a simplified flow diagram of a process integrating butyl rubber halogenation and nanocomposite formation according to another embodiment of the present invention.

In the embodiment of FIG. 7, the first portion 18 can be mixed with clay 22 under acidic conditions, and the neutralization can occur by mixing neutralizing agent 40 in excess in vessel 42.

Other combinations or orders of adding neutralizing agent, functionalization agent, and/or modifying agent can be used.

The elastomer can be functionalized with an amine, for example, as described above. A functionalized halogenated elastomer, as described above, can exhibit strong ionic interactions, and thus the amount of functionality that may be introduced is limited as a high degree of functionality could lead to gel formation and to unprocessable elastomer.

Because an excessively high degree of functionality in the finished product is not desirable, stream 18 can be from 1 to 30% of stream 16; alternatively, stream 18 can be from 5 to 20% of stream 16; alternatively from 8 to 15% of stream 16. The ionic interaction between the functionalized elastomer and clay surface will stabilize the exfoliated clay, yet the concentration of the functionalized elastomer is low enough to avoid gelation. When mixed back with the base elastomer, the final nanocomposite product can have enhanced barrier properties as well as good processability.

Although illustrated by general process steps, one of ordinary skill in the art readily recognizes that additional processing steps and equipment not detailed in the description above may be necessary.

Emulsion Processing

In the above processes, where clay dispersion 22 is a slurry of inorganic clay in water, the elastomer/clay nanocomposite stream 26 can be produced by emulsion processes in a vessel or pump 24. In one embodiment, the process can comprise mixing an aqueous slurry of inorganic clay with an elastomer solution (cement). The mixing should be sufficiently vigorous to form emulsions or micro-emulsions. In some embodiments, the emulsions can be formed as an aqueous solution or suspension in an organic solution. Standard methods and equipment for both lab and large-scale production, including batch and continuous processes may be used to produce the elastomeric nanocomposites of the invention.

In certain embodiments, a nanocomposite is produced by a process comprising contacting Solution A comprising water and at least one layered filler with Solution B comprising a solvent and at least one elastomer; and removing the solvent and water from the contact product of Solution A and Solution B to form a nanocomposite.

In some embodiments, a nanocomposite is produced by a process comprising contacting Solution A comprising water and at least one layered filler with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally a few seconds. For general emulsion information, see generally, "Colloidal Systems and Interfaces", S. Ross and I. D. Morrison, J. W. Wiley, NY, 1988.

In certain embodiments, the emulsion is formed by subjecting the mixture to agitation using a high-shear mixer.

When used, the surfactant concentration is sufficient to allow the formation of a relatively stable emulsion. Preferably, the amount of surfactant employed is at least 0.001 wt % of the total emulsion, more preferably about 0.001 to about 3 wt %, and most preferably 0.01 to less than 2 wt %.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates; and the like.

In other embodiments, a nanocomposite is produced by a process comprising mixing an aqueous slurry of inorganic clay with an elastomer solution wherein the elastomer comprises amine-functionalized monomer unit described by the following:

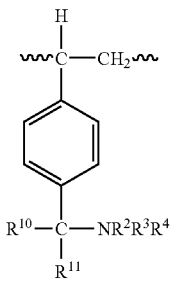

wherein $R^{10}$ and $R^{11}$ are the same or different and are one of a hydrogen, a $C_1$ to $C_7$ alkyl, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitrites, ethoxylated amines, acrylates, esters and ammonium ions. The functional groups and optional components are as described above in the indicated amounts.

In one embodiment, the elastomer and functionalized amine are combined in a first step, followed by emulsification with an aqueous slurry comprising at least one clay.

In certain embodiments, at least one of $R^2$, $R^3$ and $R^4$ can be a $C_1$ to $C_{20}$ aliphatic alcohols or ethers. In these embodiments, the amine functionalized elastomer can act as a self-emulsifier, negating or minimizing the need for additional surfactant or emulsifier to form a stable emulsion, and can enhance the extraction of the clay from the aqueous phase and can promote exfoliation of the clay. In certain embodiments, the functional group can be N-methyldiethanolamine, N,N-dimethylethanolamine, triethanolamine, or combinations thereof or the like.

Figure 8:
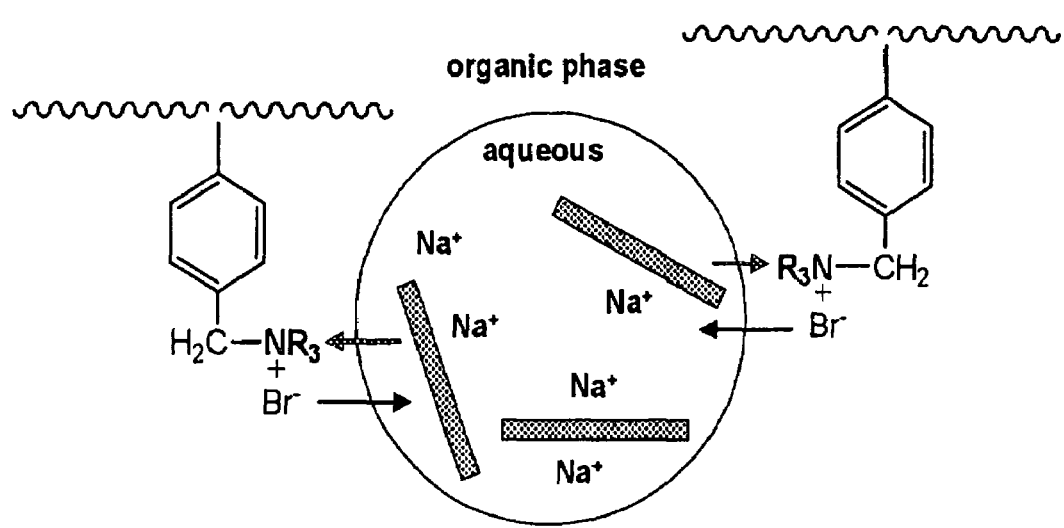
FIG. 8 illustrates an emulsion formed during one embodiment of the process of the present invention.

By contacting an aqueous clay slurry with organic solution of functionalized elastomers in micro-emulsions, the interaction between the exfoliated clay and elastomers, especially functionalized ionic elastomers, provides a driving force to keep the clay exfoliated in the elastomer matrix (as illustrated in FIG. 8), enhancing the exfoliation of the clays and resulting in nanocomposites with improved barrier properties.

The nanocomposite formed in the emulsion process above can be recovered by processes such as, for example, by precipitating the elastomer from solution, recovering the precipitated elastomer/clay nanocomposite from the solvent, antisolvent, and water, and drying the recovered nanocomposite. Alternatively, the organic solvent can be vaporized with steam and the resulting elastomer slurry passed through a series of extruders to dry the nanocomposite. Other processes to recover the nanocomposite can also be used; the scope of the present invention is not limited to any particular recovery processes.

The final composition is formable and curable into such articles as air barriers, in particular, innertubes and innerliners.

Suitable solvents used to form the elastomer solution are fully described in WO 02/100935 and WO 02/100936. Preferably the solvent comprises one or more alkanes, alkenes, aromatics, nitrated alkanes, halogenated alkanes, or mixtures thereof. Preferably the solvent comprises one or more C2 to C40 linear branched or cyclic alkanes. Preferably the solvent comprises one or more of hexane, cyclohexane, toluene, tetrahydrofuran, butane, isobutene, pentane, octane isooctane, nonane dodecane or mixtures thereof.

In the embodiments described above, solvents may be present in the production of the nanocomposite composition from 30 to 99 weight percent, alternatively from 40 to 99 weight percent, alternatively from 50 to 99 weight percent, alternatively from 60 to 99 weight percent, alternatively from 70 to 99 weight percent, alternatively from 80 to 99 weight percent, alternatively from 90 to 99 weight percent, alternatively from 95 to 99 weight percent, alternatively from 70 to 90 weight percent, alternatively from 75 to 90 weight percent, based upon the total weight of the elastomer solution.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

The aqueous slurry of clay and water can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In certain embodiments, when the aqueous slurry of clay is prepared, the clay can comprise from 0.01 to 40 weight percent of the aqueous slurry, alternatively from 0.1 to 5.0 weight percent, alternatively from 0.3 to 3.0 weight percent, based upon the total weight of the slurry.

In certain embodiments, the ratio of the aqueous slurry of clay to the elastomer solution in the emulsion can be from 0.01:1 to 1:1; alternatively from 0.1:1 to 0.9:1; alternatively from 0.3:1 to 0.7:1.

In certain embodiments, the pH of the aqueous slurry of clay can be acidic, neutral, or basic. In one embodiment, the pH of the aqueous slurry of clay can be between 4 and 13.

In still another embodiment, the invention provides for a process to improve the air impermeability of an elastomer comprising contacting at least one elastomer solution, and at least one aqueous slurry comprising an unmodified layered filler (such as inorganic clay for one example) to form a nanocomposite, wherein the oxygen transmission rate of the nanocomposite is 150 mm.cc/[m$^2$.day] at 40° C. or lower as measured on cured nanocomposite compositions or articles as described herein.

Alternatively, the oxygen transmission rate is 150 mm.cc/[m$^2$.day] at 40° C. or lower as measured on cured nanocomposite compounds as described herein; the oxygen transmission rate is 140 mm.cc/[m$^2$.day] at 40° C. or lower as measured on cured nanocomposite compounds as described herein; the oxygen transmission rate is 130 mm.cc/[m$^2$.day] at 40° C. or lower as measured on cured nanocomposite compounds as described herein; the oxygen transmission rate is 120 mm.cc/[m2.day] at 40° C. or lower as measured on cured nanocomposite compounds as described herein; the oxygen transmission rate is 110 mm.cc/[m$^2$.day] at 40° C. or lower as measured on cured nanocomposite compounds as described herein; the oxygen transmission rate is 100 mm.cc/[m$^2$.day] at 40° C. or lower as measured on cured nanocomposite compounds as described herein; or the oxygen transmission rate is 90 mm.cc/[m$^2$.day] at 40° C. or lower as measured on cured nanocomposite compounds as described herein. This invention also relates to 1. A process to produce a nanocomposite comprising the steps of: contacting a solution of elastomer in an organic solvent with a halogen to form a halogenated elastomer cement; treating a first portion of the halogenated elastomer cement with a clay dispersion to form a masterbatch comprising a concentrated polymer-clay nanocomposite;

blending the masterbatch with a second portion of the halogenated elastomer cement to form a mixture comprising a dispersed halogenated elastomer-clay nanocomposite;

recovering the halogenated elastomer-clay nanocomposite from the mixture.

2. The process of paragraph 1 further comprising the step of: neutralizing the halogenated elastomer cement from step (a) prior to the treatment in step (b).

3. The process of paragraph 1 or 2 further comprising the step of: neutralizing the mixture from step (c) prior to the recovery in step (d).

4. The process of paragraph 1, 2, or 3 wherein the elastomer comprises butyl rubber.

5. The process of paragraph 4 wherein the butyl rubber comprises from 1 to 30 percent by weight of the cement.

6. The process of paragraph 4 wherein the butyl rubber comprises from 10 to 25 percent by weight of the cement.

7. The process of any one of paragraphs 1 to 6 wherein the clay dispersion comprises an aqueous slurry of clay comprising from 0.1 to 5.0 percent by weight of the slurry.

8. The process of any one of paragraphs 1 to 7 wherein the clay dispersion comprises an aqueous slurry of clay comprising from 0.3 to 3.0 percent by weight of the slurry.

9. The process of any one of paragraphs 1 to 8 wherein a pH of the slurry is between 4 and 13.

10. The process of any one of paragraphs 1 to 9 wherein a volume ratio of slurry to halogenated elastomer cement in step (b) is from 0.01:1 to 1:1.

11. The process of paragraph 10 wherein a volume ratio of slurry to elastomer cement in step (b) is from 0.1:1 to 0.9:1.

12. The process of paragraph 10 wherein a volume ratio of slurry to elastomer cement in step (b) is from 0.3:1 to 0.7:1.

13. The process of any one of paragraphs 1 to 12 wherein a weight ratio of the first portion of halogenated elastomer cement to the second portion of halogenated elastomer cement is from 1:99 to 30:70.

14. The process of any one of paragraphs 1 to 13 wherein the clay dispersion comprises inorganic clay.

15. The process of any one of paragraphs 1 to 14 wherein the clay dispersion is an aqueous slurry of clay.

16. The process of any one of paragraphs 1 to 15 wherein the clay dispersion comprises clay dispersed in an organic liquid miscible with water.

17. The process of any one of paragraphs 1 to 16 wherein the clay dispersion comprises clay dispersed in an organic liquid immiscible with water.

18. The process of any one of paragraphs 1 to 17 wherein the clay dispersion comprises modifiers, surfactants, emulsifiers, stabilizers, exfoliants, or combinations thereof.

19. The process of any one of paragraphs 1 to 18 wherein the slurry is essentially free of organoclay.

20. The process of any one of paragraphs 1 to 19 wherein the clay dispersion comprises modified clay.

21. The process of any one of paragraphs 1 to 20 wherein the halogenated elastomer comprises halogenated isobutylene polymer.

22. The process of paragraph 21 wherein the halogen comprises bromine or chlorine.

23. The process of any one of paragraphs 1 to 22 wherein the recovery comprises filtering the nanocomposite from the mixture.

24. The process of any one of paragraphs 1 to 23 wherein the mixture is an emulsion and the recovery comprises filtering the nanocomposite from at least one phase of the mixture.

25. The process of any one of paragraphs 1 to 24 wherein the mixture is an emulsion and the recovery comprises precipitating the elastomer-clay nanocomposite with an antisolvent.

26. The process of any one of paragraphs 1 to 25 wherein the recovery comprises evaporating liquid from at least one phase of the mixture.

27. The process of any one of paragraphs 1 to 26 wherein the clay dispersion is inorganic clay in an aqueous slurry and the recovery comprises:

evaporating the solvent from the mixture from (c) to form an aqueous nanocomposite suspension; and, processing the suspension through one or more extruders to dry the nanocomposite.

28. The process of any one of paragraphs 1 to 27 wherein the first portion of the halogenated polymer solution is functionalized to form a polymer chain E comprising an ammonium-functionalized group.

29. The process of paragraph 28 wherein the ammonium functionalized group is described by the following group pendant to the polymer chain E:

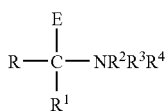

wherein R and $R^1$ are the same or different and are one of hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions.

30. The process of paragraph 29 wherein the ammonium functionalized group is selected from the group consisting of N-methyldiethanolamine, N,N-dimethylethanolamine, triethanolamine, or combinations thereof.

31. The process of any one of paragraphs 1 to 29 wherein the step (b) further comprises adding an emulsifier to the mixture.

32. The process of paragraph 31 wherein the emulsifier is selected from the group consisting of tertiary amines, diamines, polyamines, amine salts, quaternary ammonium compounds, alkyl glucosides, and ethoxylates.

33. The process of paragraph 31 wherein the emulsifier comprises alkyl ethoxylate, linear alcohol ethoxylate, amide ethoxylate, amine ethoxylate, or phenol or alkyl phenol ethoxylate.

34. The process of paragraph 31 wherein the emulsifier comprises coco amine ethoxylate, tallow amine ethoxylate, oleyl amine ethoxylate, or nonyl phenol ethoxylate.

35. The process of any one of paragraphs 14 to 34 wherein the inorganic clay comprises a silicate.

36. The process of paragraph 35 wherein the silicate comprises smectite clay.

37. The process of paragraph 36 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

38. The process of paragraph 36 wherein the smectite clay comprises montmorillonite, bentonite, vermiculite, or a combination thereof.

39. The process of any of paragraphs 14 to 34 wherein the inorganic clay is modified with an exfoliating additive.

40. The process of paragraph 39 wherein the exfoliating additive is selected from the group consisting of ammonium ion, alkylamines, diamines, alkylammonium ion, and phosphonium or sulfonium derivatives of aliphatic, aromatic or arylaliphatic amines, phosphines, and sulfides.

41. The process of paragraph 40 wherein the amine compound has the structure $R^{12}R^{13}R^{14}N$, wherein $R^{12}$, $R^{13}$, and $R^{14}$ are the same or different $C_1$ to $C_{30}$ alkyls or alkenes.

42. The process of paragraph 40 wherein the amine compound has the structure $R^{12}R^{13}R^{14}N$, wherein $R^{12}$, $R^{13}$, and $R^{14}$ are the same or different $C_1$ to $C_{20}$ alkyl or alkene.

43. The process of paragraph 41 or 42 wherein the amine compound is a long chain tertiary amine, wherein at least $R^{12}$ is a $C_{14}$ to $C_{20}$ alkyl or alkene.

44. The process of paragraph 39 wherein the exfoliating additive comprises a diamine having the structure $R^{18}R^{19}N$—$R^{20}$—$NR^{21}R^{22}$, wherein $R^{18}$, $R^{19}$, $R^{20}$, $R^{21}$, and $R^{22}$ are the same or different $C_1$ to $C_{30}$ alkyls or alkenes.

45. The process of paragraph 44 wherein $R^{18}$, $R^{19}$, $R^{20}$, $R^{21}$, and $R^{22}$ comprise $C_1$ to $C_{20}$ alkyls or alkenes.

46. The process of paragraph 39 wherein at least one of $R^{18}$, $R^{19}$, $R^{21}$, and $R^{22}$ has from 8 to 30 carbon atoms.

47. The process of paragraph 45, wherein at least one of $R^{18}$, $R^{19}$, $R^{21}$, and $R^{22}$ has from 14 to 20 carbon atoms.

48. The process of paragraph 47 wherein the exfoliating additive is selected from the group consisting of N-coco-1,3-diaminopropane, N-oleyl-1,3-diaminopropane, N-tallow-1,3-diaminopropane, N,N,N'-trimethyl-N'-tallow-1,3-diaminopropane, and combinations thereof.

49. The process of paragraph 39 wherein the exfoliating additive is a polysilane of the structure —Si($R^{15}$)$_2R^{16}$ where $R^{15}$ is the same or different at each occurrence and is selected from alkyl, alkoxy or oxysilane and $R^{16}$ is an organic radical compatible with the matrix polymer of the composite.

50. The process of paragraph 39 wherein the exfoliating additive comprises protonated amino acids or a salt thereof containing 2-30 carbon atoms.

51. The process of any one of paragraphs 1 to 50 wherein the elastomer comprises an interpolymer of a C4-C7 isoolefin and an alkylstyrene.

52. The process of paragraph 51 wherein the alkylstyrene comprises para-methylstyrene.

53. The process of any one of paragraphs 1 to 52 wherein the elastomer comprises functional groups selected from the group consisting of halides, ethers, amines, amides, esters, acids, and hydroxyls.

54. The process of any one of paragraphs 1 to 53 wherein the solvent comprises alkanes, alkenes, aromatics, nitrated alkanes, halogenated alkanes, and mixtures thereof.

55. The process of paragraph 54 wherein the solvent comprises hexane and or cyclohexane.

56. A process to produce a nanocomposite comprising the steps of:
  (a) contacting a solution of butyl rubber in an organic solvent with a halogen to form a halogenated butyl rubber solution;
  (b) neutralizing the halogenated rubber solution with a base to from a neutralized halogenated butyl rubber solution;
  (c) contacting a first portion of the neutralized halogenated butyl rubber solution with a functionalizing agent to form a functionalized butyl rubber solution;
  (d) mixing an aqueous slurry of inorganic clay with the functionalized butyl rubber solution to form an emulsion masterbatch comprising a concentrated polymer-clay nanocomposite;
  (e) blending the masterbatch with a second portion of the halogenated butyl rubber solution to form a mixture comprising a polymer-clay nanocomposite dispersed in the halogenated butyl rubber;
  (f) recovering the halogenated butyl rubber—clay nanocomposite from the second emulsion.

57. A method to produce a nanocomposite comprising:
  (a) a process of preparing a halogenated rubber composition comprising: (1) contacting a solution of butyl rubber in an organic solvent with a halogen to form a halogenated butyl rubber solution; (2) neutralizing the halogenated rubber solution with a base to form a neutralized halogenated butyl rubber solution; and (3) removing liquid from the neutralized halogenated butyl rubber solution to recover the halogenated butyl rubber composition;
  (b) withdrawing a rubber slipstream at a takeoff from the process in (a) upstream from the recovery;
  (c) admixing clay in the rubber slipstream to form a masterbatch; and
  (d) introducing the masterbatch into the process in (a) whereby the recovered composition comprises clay nanocomposite.

58. The process of paragraph 57 wherein the masterbatch is introduced into the process in (a) downstream from the takeoff and upstream from the recovery.

Permeability Testing

For each of the following examples, the nanocomposites formed were analyzed for permeability properties using the following method. In certain embodiments, 36 grams of the clay-rubber mixture was loaded into a Brabender® mixer at a temperature of 130-145° C. and mixed with 20 grams of carbon black (N660) for 7 minutes. The mixture was further mixed with a curatives package of 0.33 g stearic acid, 0.33 g ZnO (Kadox 911available from C. P. Hall (Chicago, Ill.)), and 0.33 g MBTS at 40° C. and 40 rpm for 3 minutes. The resulting rubber compounds were milled, compression molded and cured at 170° C. All specimens were compression molded with slow cooling to provide defect free pads. A compression and curing press was used for rubber samples. Typical thickness of a compression molded pad is around 15 mil (8.1 microns). using an Arbor press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et. al. in 8 JOURNAL OF POLYMER SCIENCE: PART A-2 467 (1970). Disks thus prepared were mounted on a template and sealed with a vacuum grease. 10 psi (0.07 MPa) nitrogen was kept on one side of the disk, whereas the other side is 10 psi (0.07 MPa) oxygen. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen permeability. Permeability was measured as oxygen transmission rate on a Mocon WX-TRAN 2/61 at 40° C. Where multiple samples were prepared using the same procedure, permeation rates are given for each sample.

In certain embodiments, a useful formulation for property evaluation would be as follows:

| Material I.D. | Parts |
| --- | --- |
| Elastomer/Clay | 100 + x parts of clay |
| Carbon black N660 | 60.0 |
| Stearic Acid | 1.0 |
| ZnO Kadox 911 | 1.0 |
| MBTS | 1.0 |

Carbon black N660 can be obtained from, e.g., Cabot Corp. (Billerica, Mass.). Stearic acid, a cure agent, can be obtained from, e.g., C. K. Witco Corp. (Taft, La.), Kadox 911, a ZnO activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

EXAMPLE 1

Polymer Part 1: Four grams of BIMS 03-1 (10 wt % of PMS, 0.8 mol % Br) were dissolved in 1000 mL of hexane in a 2-liter reactor. The polymer cement was heated to 75° C. for 2 hours. Aqueous slurry of Cloisite Na+ (2 g) and water was prepared separately. The aqueous slurry of clay was added to the polymer cement with high shear mixing and 1 g of ethoxylated (5)cocoalkylamine (Ethmeen C/15 from Akzo Nobel) was added to give a stable emulsion.

Polymer Part 2: Forty-six grams of BIMS 03-1 (10 wt % of PMS, 0.8 mol % Br) were dissolved in 500 mL hexane.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

EXAMPLE 2

Polymer Part 1: Six grams of BIMS 03-1 (10 wt % of PMS, 0.8 mol % Br) were dissolved in 1000 mL of hexane in a 2-liter reactor. The polymer cement was heated to 75° C. for 2 hours and 0.8 g of dimethylethanol amine (Aldrich) were added. The reaction was kept at 75° C. for 2 hours. Aqueous slurry of Cloisite Na+ (2 g) and water was prepared separately. The aqueous slurry of clay was added to the polymer cement with high shear mixing and 1 g of ethoxylated (5)cocoalkylamine (Ethmeen C/15 from Akzo Nobel) was added to give a stable emulsion.

Polymer Part 2: Forty-six grams of BIMS 03-1 (10 wt % of PMS, 0.8 mol % Br) was dissolved in 500 mL hexane.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

EXAMPLE 3

Polymer Part 1: Six grams of BIMS 03-1 (10 wt % of PMS, 0.8 mol % Br) was dissolved in 800 mL of toluene in a 2-liter reactor. Then, 0.8 g of dimethylethanol amine (Aldrich) were dissolved in 100 mL isopropanol and added to the polymer cement. The reaction was heated to and kept at 80° C. for three hours. Aqueous slurry of Cloisite Na+ (2 g) and water was prepared separately. The aqueous slurry of clay was added to the polymer cement with high shear mixing and 2 g of ethoxylated (5)cocoalkylamine (Ethmeen C/15 from Akzo Nobel) was added to give a stable emulsion. The emulsion was mixed for 15 minutes.

Polymer Part 2: Forty-six grams of BIMS 03-1 (10 wt % of PMS, 0.8 mol % Br) was dissolved in 500 mL toluene.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

EXAMPLE 4

Polymer Part 1: Four grams of BIMS 03-1 (10 wt % of PMS, 0.8 mol % Br) were dissolved in 800 mL of toluene in a 2-liter reactor. Then, 0.5 g of dimethylethanol amine (Aldrich) were dissolved in 10 mL of isopropanol and added to the polymer cement. The polymer cement was heated to and kept at 80° C. for 3 hours. Aqueous slurry of Cloisite Na+ (2 g) and water was prepared separately. The aqueous slurry of clay was added to the polymer cement with high shear mixing and 2 g of ethoxylated (5)cocoalkylamine (Ethmeen C/15 from Akzo Nobel) was added to give a stable emulsion.

Polymer Part 2: Fourty-four grams of BIMS 03-1 (10 wt % of PMS, 0.8 mol % Br) were dissolved in 500 mL toluene.

The cement of Polymer Part 2 was mixed with the emulsion of Part 1 in a high shear mixer for 15 min. The polymer/clay nanocomposite was precipitated by addition of isopropyl alcohol and dried in a vacuum oven at 85° C. for 16 hours.

TABLE 1

Permeation Rate Measurements for Examples 1-4.

| Example | Permeation Rate (mm · cc/m2 · day, 40° C.) |
| --- | --- |
| 1 | 89.6/94.4 |
| 2 | 96.9/96.5 |
| 3 | 103.4/99.4 |
| 4 | 84.9/90.0 |

EXAMPLE 5

Polymer Part 1: Five grams of BIMS 03-1 (10 wt % of PMS, 0.8 mol % Br) were dissolved in 500 mL of toluene in a 2-L reactor. The polymer cement was heated to 80° C. N,N-dimethylethanol amine (0.6 mL, Aldrich) was dissolved in 200 mL of isopropanol and added to the polymer cement. The reaction was kept at 80° C. for 4 hours. Aqueous slurry of Cloisite Na+ (75 g of 2.83 wt % slurry from Southern Clay) in water (400 mL) was prepared separately. The aqueous slurry of clay was added to polymer cement and mixed in a high-shear mixer (Silverson L4RT) at 6000 RPM for 15 min to give a stable emulsion.

Polymer Part 2: Forty-five grams of BIMS 03-1 (10 wt % of PMS, 0.8 mol % Br) were dissolved in 500 mL of toluene. The cement of Polymer Part 2 was mixed with emulsion of Polymer Part 1 in a high-shear mixer (Silverson L4RT) for 15 min. The polymer/clay nanocomposite was precipitated by addition of isopropyl alcohol, and dried in a vacuum oven at 85° C. for 16 hours.

EXAMPLE 6

Polymer Part 1: Five grams of BIMS 03-1 (10 wt % of PMS, 0.8 mol % Br) were dissolved in 500 mL of toluene in a 2-L reactor. The polymer cement was heated to 80° C. N-methyldiethanol amine (0.8 mL, Aldrich) was dissolved in 200 mL of isopropanol and added to the polymer cement. The reaction was kept at 80° C. for 4 hours. Aqueous slurry of Cloisite Na+ (75 g of 2.83 wt % slurry from Southern Clay) in water (400 mL) was prepared separately. The aqueous slurry of clay was added to polymer cement and mixed in a high-shear mixer (Silverson L4RT) at 6000 RPM for 15 min to give a stable emulsion.

Polymer Part 2: Forty-five grams of BIMS 03-1 (10 wt % of PMS, 0.8 mol % Br) were dissolved in 500 mL of toluene. The cement of Polymer Part 2 was mixed with emulsion of Polymer Part 1 in a high-shear mixer (Silverson L4RT) for 15 min. The polymer/clay nanocomposite was precipitated by addition of isopropyl alcohol, and dried in a vacuum oven at 85° C. for 16 hours.

EXAMPLE 7

Polymer Part 1: Five grams of BIMS 03-1 (10 wt % of PMS, 0.8 mol % Br) were dissolved in 500 mL of toluene in a 2-L reactor. The polymer cement was heated to 70° C. N,N-dimethylethanol amine (1.0 mL, Aldrich) was dissolved in 150 mL of isopropanol and added to the polymer cement. The reaction was kept at 70° C. for 3 hours. A slurry of modified clay Cloisite 20A (4 g, from Southern Clay) and toluene (400 mL) was prepared separately by mixing the slurry with a high-shear mixer (Silverson L4RT) at 6000 RPM for 15 min. The slurry of clay was added to polymer cement and mixed in a high-shear mixer (Silverson L4RT) at 6000 RPM for 15 min.

Polymer Part 2: Forty-five grams of BIMS 03-1 (10 wt % of PMS, 0.8 mol % Br) was dissolved in 400 mL of toluene. The cement of Polymer Part 2 was mixed with emulsion of Polymer Part 1 in a high-shear mixer (Silverson L4RT) for 15 min. The polymer/clay nanocomposite was precipitated by addition of isopropyl alcohol, and dried in a vacuum oven at 85° C. for 16 hours.

EXAMPLE 8

Polymer Part 1: Five grams of BIMS 03-1 (10 wt % of PMS, 0.8 mol % Br) were dissolved in 500 mL of hexane in a 2-L reactor. The polymer cement was heated to 70° C. N,N-dimethylethanol amine (1.0 mL, Aldrich) was dissolved in 150 mL of isopropanol and added to the polymer cement. The reaction was kept at 70° C. for 3 hours. A slurry of modified clay Cloisite 20A (4 g, from Southern Clay) and hexane (400 mL) was prepared separately by mixing the slurry with a high-shear mixer (Silverson L4RT) at 6000 RPM for 15 min. The slurry of clay was added to polymer cement and mixed in a high-shear mixer (Silverson L4RT) at 6000 RPM for 15 min.

Polymer Part 2: Forty-five grams of BIMS 03-1 (10 wt % of PMS, 0.8 mol % Br) was dissolved in 400 mL of hexane. The cement of Polymer Part 2 was mixed with emulsion of Polymer Part 1 in a high-shear mixer (Silverson L4RT) for 15 min. The polymer/clay nanocomposite was precipitated by addition of isopropyl alcohol, and dried in a vacuum oven at 85° C. for 16 hours.

TABLE 2

Permeation measurement results for Examples 5-8.

| Example | Clay | Clay in Nanocomposite (phr) | Permeation Rate (mm · cc/m2 · day, 40° C.) |
| --- | --- | --- | --- |
| 5 | Closite Na+ | 4 | 82.81; 82.81 |
| 6 | Closite Na+ | 4 | 88.20; 86.32 |
| 7 | Cloisite 20A | 8 | 95.40; 85.86 |
| 8 | Cloisite 20A | 8 | 95.22; 94.40 |

Embodiments of the final nanocomposite of the present invention are useful as air barriers, such as used in producing innerliners for motor vehicles. In particular, the nanocomposites are useful in innerliners and innertubes for articles such as truck tires, bus tires, passenger automobile, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted, to the extent they are not inconsistent with this specification. Further, all documents cited herein, including testing procedures, are herein fully incorporated by reference for all jurisdictions in which such incorporation is permitted, to the extent they are not inconsistent with this specification.

The invention claimed is:

1. A process to produce a nanocomposite comprising the steps of:
   (a) contacting a solution of elastomer in an organic solvent with a halogen to form a halogenated elastomer cement;
   (b) treating a first portion of the halogenated elastomer cement with a clay dispersion to form a masterbatch comprising a concentrated polymer-clay nanocomposite;
   (c) blending the masterbatch with a second portion of the halogenated elastomer cement to form a mixture comprising a dispersed halogenated elastomer-clay nanocomposite; and
   (d) recovering the halogenated elastomer-clay nanocomposite from the mixture.

2. The process of claim 1 further comprising the step of:
   neutralizing the halogenated elastomer cement from step (a) prior to the treatment in step (b).

3. The process of claim 1 further comprising the step of:
   neutralizing the mixture from step (c) prior to the recovery in step (d).

4. The process of claim 1 wherein the elastomer comprises butyl rubber.

5. The process of claim 4 wherein the butyl rubber comprises from 1 to 30 percent by weight of the cement.

6. The process of claim 4 wherein the butyl rubber comprises from 10 to 25 percent by weight of the cement.

7. The process of any one of claims 1-3 wherein the clay dispersion comprises an aqueous slurry of clay comprising from 0.1 to 5.0 percent by weight of the slurry.

8. The process of any one of claims 1-3 wherein the clay dispersion comprises an aqueous slurry of clay comprising from 0.3 to 3.0 percent by weight of the slurry.

9. The process of claim 7 wherein a pH of the slurry is between 4 and 13.

10. The process of claim 7 wherein a volume ratio of slurry to halogenated elastomer cement in step (b) is from 0.01:1 to 1:1.

11. The process of claim 7 wherein a volume ratio of slurry to elastomer cement in step (b) is from 0.1:1 to 0.9:1.

12. The process of claim 8 wherein a volume ratio of slurry to elastomer cement in step (b) is from 0.3:1 to 0.7:1.

13. The process of claim 1 wherein a weight ratio of the first portion of halogenated elastomer cement to the second portion of halogenated elastomer cement is from 1:99 to 30:70.

14. The process of claim 7 wherein the clay dispersion comprises inorganic clay.

15. The process of claim 1 wherein the clay dispersion is an aqueous slurry of clay.

16. The process of claim 1 wherein the clay dispersion comprises clay dispersed in an organic liquid miscible with water.

17. The process of claim 1 wherein the clay dispersion comprises clay dispersed in an organic liquid immiscible with water.

18. The process of claim 1 wherein the clay dispersion comprises modifiers, surfactants, emulsifiers, stabilizers, exfoliants, or combinations thereof.

19. The process of claim 7 wherein the slurry is essentially free of organoclay.

20. The process of claim 1 wherein the clay dispersion comprises modified clay.

21. The process of claim 1 wherein the halogenated elastomer comprises halogenated isobutylene polymer.

22. The process of claim 1 wherein the halogen comprises bromine or chlorine.

23. The process of claim 1 wherein the recovery comprises filtering the nanocomposite from the mixture.

24. The process of claim 1 wherein the mixture is an emulsion and the recovery comprises filtering the nanocomposite from at least one phase of the mixture.

25. The process of claim 1 wherein the mixture is an emulsion and the recovery comprises precipitating the elastomer-clay nanocomposite with an antisolvent.

26. The process of claim 1 wherein the recovery comprises evaporating liquid from at least one phase of the mixture.

27. The process of claim 1 wherein the clay dispersion is inorganic clay in an aqueous slurry and the recovery comprises:
   evaporating the solvent from the mixture from (c) to form an aqueous nanocomposite suspension; and processing the suspension through one or more extruders to dry the nanocomposite.

28. The process of claim 1 or 15 wherein the first portion of the halogenated polymer solution is functionalized to form a polymer chain E comprising an ammonium-functionalized group.

29. The process of claim 28 wherein the ammonium functionalized group is described by the following group pendant to the polymer chain E:

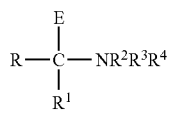

wherein R and $R^1$ are the same or different and are one of hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted Ct to $C_{20}$ alkyls, alkenes or aryls, $C_1$ to $C_{20}$ aliphatic alcohols or ethers, $C_1$ to $C_{20}$ carboxylic acids, nitrites, ethoxylated amines, acrylates, esters and ammonium ions.

30. The process of claim 29 wherein the ammonium functionalized group is selected from the group consisting of N-methyldiethanolamine, N,N-dimethylethanolamine, triethanolamine, or combinations thereof.

31. The process of claim 1 or 15 wherein the step (b) further comprises adding an emulsifier to the mixture.

32. The process of claim 31 wherein the emulsifier is selected from the group consisting of tertiary amines, diamines, polyamines, amine salts, quaternary ammonium compounds, alkyl glucosides, and ethoxylates.

33. The process of claim 31 wherein the emulsifier comprises alkyl ethoxylate, linear alcohol ethoxylate, amide ethoxylate, amine ethoxylate, or phenol or alkyl phenol ethoxylate.

34. The process of claim 31 wherein the emulsifier comprises coco amine ethoxylate, tallow amine ethoxylate, oleyl amine ethoxylate, or nonyl phenol ethoxylate.

35. The process of claim 14 wherein the inorganic clay comprises a silicate.

36. The process of claim 35 wherein the silicate comprises smectite clay.

37. The process of claim 36 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

38. The process of claim 36 wherein the smectite clay comprises montmorillonite, bentonite, vermiculite, or a combination thereof.

39. The process of claim 14 wherein the inorganic clay is modified with an exfoliating additive.

40. The process of claim 39 wherein the exfoliating additive is selected from the group consisting of ammonium ion, alkylamines, diamines, alkylammonium ion, and phosphonium or sulfonium derivatives of aliphatic, aromatic or arylaliphatic amines, phosphines, and sulfides.

41. The process of claim 40 wherein the amine compound has the structure $R^{12}R^{13}R^{14}N$, wherein $R^{12}$, $R^{13}$, and $R^{14}$ are the same or different $C_1$ to $C_{30}$ alkyls or alkenes.

42. The process of claim 40 wherein the ainine compound has the structure $R^{12}R^{13}R^{14}N$, wherein $R^{12}$, $R^{13}$, and $R^{14}$ are the same or different $C_1$ to $C_{20}$ alkyl or alkene.

43. The process of claim 41 or 42 wherein the amine compound is a long chain tertiary amine, wherein at least $R^{12}$ is a $C_{14}$ to $C_{20}$ alkyl or alkene.

44. The process of claim 39 wherein the exfoliating additive comprises a diamine having the structure $R^{18}R^{19}N$—$R^{20}$—$NR^{21}R^{22}$, wherein $R^{18}$, $R^{19}$, $R^{20}$, $R^{21}$, and $R^{22}$ are the same or different $C_1$ to $C_{30}$ alkyls or alkenes.

45. The process of claim 44 wherein $R^{18}$, $R^{19}$, $R^{20}$, $R^{21}$, and $R^{22}$ comprise $C_1$ to $C_{20}$ alkyls or alkenes.

46. The process of claim 39 wherein at least one of $R^{18}$, $R^{19}$, $R^{21}$, and $R^{22}$ has from 8 to 30 carbon atoms.

47. The process of claim 45, wherein at least one of $R^{18}$, $R^{19}$, $R^{21}$, and $R^{22}$ has from 14 to 20 carbon atoms.

48. The process of claim 47 wherein the exfoliating additive is selected from the group consisting of N-coco-1,3-diaminopropane, N-oleyl-1,3-diaminopropane, N-tallow-1,3-diaminopropane, N,N,N'-trimethyl-N'-tallow-1,3-diaminopropane, and combinations thereof.

49. The process of claim 39 wherein the exfoliating additive is a polysilane of the structure —$Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

50. The process of claim 39 wherein the exfoliating additive comprises protonated amino acids or a salt thereof containing 2-30 carbon atoms.

51. The process of claim 1 wherein the elastomer comprises an interpolymer of a C4-C7 isoolefin and an alkylstyrene.

52. The process of claim 51 wherein the alkylstyrene comprises para-methylstyrene.

53. The process of claim 1 wherein the elastomer comprises functional groups selected from the group consisting of halides, ethers, amines, amides, esters, acids, and hydroxyls.

54. The process of claim 1 wherein the solvent comprises alkanes, alkenes, aromatics, nitrated alkanes, halogenated alkanes, and mixtures thereof.

55. The process of claim 54 wherein the solvent comprises hexane and or cyclohexane.

56. A process to produce a nanocomposite comprising the steps of:
   (a) contacting a solution of butyl rubber in an organic solvent with a halogen to form a halogenated butyl rubber solution;
   (b) neutralizing the halogenated rubber solution with a base to from a neutralized halogenated butyl rubber solution;
   (c) contacting a first portion of the neutralized halogenated butyl rubber solution with a functionalizing agent to form a functionalized butyl rubber solution;
   (d) mixing an aqueous slurry of inorganic clay with the functionalized butyl rubber solution to form an emulsion masterbatch comprising a concentrated polymer-clay nanocomposite;
   (e) blending the masterbatch with a second portion of the halogenated butyl rubber solution to form a mixture comprising a polymer-clay nanocomposite dispersed in the halogenated butyl rubber; and
   (f) recovering the halogenated butyl rubber—clay nanocomposite from the second emulsion.

57. A method to produce a nanocomposite comprising:
   (a) a process of preparing a halogenated rubber composition comprising: (1) contacting a solution of butyl rubber in an organic solvent with a halogen to form a halogenated butyl rubber solution; (2) neutralizing the halogenated rubber solution with a base to form a neutralized halogenated butyl rubber solution; and (3)

removing liquid from the neutralized halogenated butyl rubber solution to recover the halogenated butyl rubber composition;

(b) withdrawing a rubber slipstream at a takeoff from the process in (a) upstream from the recovery, (c) admixing clay in the rubber slipstream to form a masterbatch; and (d) introducing the masterbatch into the process in (a) whereby the recovered composition comprises clay nanocomposite.

58. The process of claim 57 wherein the masterbatch is introduced into the process in (a) downstream from the takeoff and upstream from the recovery.

* * * * *

UNITED STATES PATENT AND TRADEMARK OFFICE
CERTIFICATE OF CORRECTION

| | | |
|---|---|---|
| PATENT NO. | : 7,501,460 B1 | Page 1 of 1 |
| APPLICATION NO. | : 11/183361 | |
| DATED | : March 10, 2009 | |
| INVENTOR(S) | : Weiqing Weng et al. | |

It is certified that error appears in the above-identified patent and that said Letters Patent is hereby corrected as shown below:

Title page, item (73), the Assignee "ExxonMobile Chemical Patents Inc., Houston, TX (US)", should read --ExxonMobil Chemical Patents, Inc., Houston, TX (US)--.

Signed and Sealed this

Nineteenth Day of May, 2009

JOHN DOLL
*Acting Director of the United States Patent and Trademark Office*